H. B. GRANT.
PISTON.
APPLICATION FILED OCT. 4, 1920.

1,427,205.

Patented Aug. 29, 1922.

INVENTOR:
Hugo B. Grant
BY
ATTORNEYS.

UNITED STATES PATENT OFFICE.

HUGO B. GRANT, OF CHICAGO, ILLINOIS.

PISTON.

1,427,205.  Specification of Letters Patent.  Patented Aug. 29, 1922.

Application filed October 4, 1920. Serial No. 414,564.

*To all whom it may concern:*

Be it known that I, HUGO B. GRANT, a citizen of the United States, residing at Chicago, in the county of Cook and State of Illinois, have invented new and useful Improvements in Pistons, of which the following is a specification.

This invention relates to pistons used in internal-combustion engines, and its object is to provide the same with a novel and improved means for effecting the lubrication of the cylinder walls.

The object stated is attained by means of a combination and arrangement of parts to be hereinafter described and claimed, and in order that the same may be better understood, reference is had to the accompanying drawing forming a part of this specification.

Figure 1:
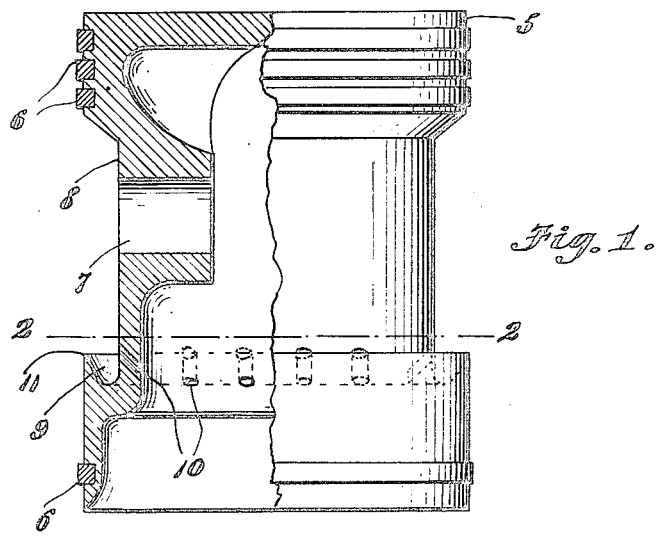
Figure 2:
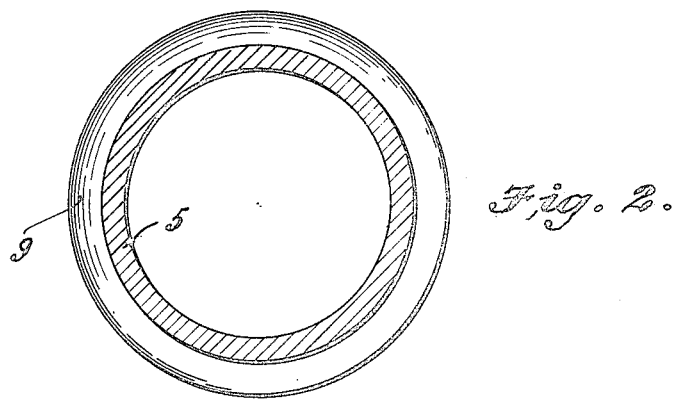

In the drawing Figure 1 is an elevation of the piston, partly in section, and Figure 2 is a horizontal section on the line 2—2 of Figure 1.

Referring specifically to the drawing, 5 denotes a piston of the trunk type usually employed in connection with internal-combustion engines. The piston is provided with the usual grooves to seat packing rings 6, and intermediate its ends it has the usual wrist-pin bearings 7. The piston may be constructed of cast iron, aluminum, or any other material usually employed in the construction of pistons of the type specified.

Intermediate its ends, and in the plane of the wrist-pin bearings 7, the piston 5 has its outer surface formed with an annular depression 8 extending completely around the latter circumferentially, and at the bottom of this depression the same is formed into an annular oil retaining trough or groove 9 which also encircles the piston and which opens into the depression. The groove 9 extends downward and its open end points in the direction of the outer end or the head of the piston. Back of the groove 9, the piston wall has a plurality of ducts 10 which are inclined downwardly or in the direction of the inner end of the piston, their inner ends opening into the interior of the piston, whereas their outer ends open into the groove 9 substantially in the plane of the top thereof. It will therefore be seen that when the level of the oil which collects in the groove 9 reaches the top of the latter, surplus oil is drained back into the crank case by the way of the ducts 10 and the interior of the piston.

The piston hereinbefore described is designed more particularly for use in connection with internal-combustion engines in which oil for lubricating the cylinder walls, is delivered through ducts in the connecting rods to hollow wrist-pins, the oil escaping from the latter to the cylinder walls. The oil escapes from the wrist-pin into the pocket formed by the depression 8 and runs down the same to collect in the groove 9, from which latter surplus oil is drained back into the crank case through the ducts 10 as hereinbefore described. When the engine is running a constant level of oil in the groove 9 is maintained, the oil filling the groove to the top thereof. It will be noted that the outer side wall of the groove 9 is beveled so that where it meets the outer surface of the piston wall, a sharp edge 11 is produced this edge being in sliding contact with the cylinder wall. On the down stroke of the piston the oil is thrown out of the groove 9 against the cylinder wall, and on the up-stroke the edge 11 acts to scrape excess oil off the cylinder wall and to direct the same back into the groove. A film of oil is therefore positively deposited on the cylinder wall, and at the same time the oil is prevented from escaping into the combustion chamber of the cylinder, thereby preventing or reducing to a minimum the formation of carbon and the fouling of the spark plug from excess oil. A perfect lubrication of the cylinder is assured at all times, with the result that friction, and its attendant wear is reduced to a minimum. The piston structure also reduces compression leaks and the consumption of fuel. A further advantage of the structure resides in the fact that the piston can be fitted closer, thereby obtaining more power and a smoother running engine. The engine will also not get as hot as where the usual type of piston is used, on account of the cutting down of friction by the oil constantly thrown on the cylinder walls. The groove 9 distributes the oil evenly around the cylinder wall and not only in two opposite places as is apt to be the case where the cylinder walls are lubricated by the oil discharging thereonto directly from the hollow wrist-pins.

I claim:

1. A piston of the type described comprising a hollow body provided with wrist-pin bearings, and having in its outer surface an annular depression completely encircling the same circumferentially, and located in the plane of the wrist-pin bearings, an encircling oil-retaining groove at the bottom of the depression opening thereinto, and means for maintaining a constant oil level in the groove.

2. A piston of the type described comprising a hollow body provided with wrist-pin bearings, and having in its outer surface an annular depression completely encircling the same circumferentially, and located in the plane of the wrist-pin bearings, an encircling oil-retaining groove at the bottom of the depression opening thereinto, the wall of the piston having ducts communicating at one end with the groove in the plane of the top thereof and at their other ends with the interior of the piston body.

3. A piston of the type described comprising a hollow body provided with wrist-pin bearings, and having in its outer surface an annular depression completely encircling the same circumferentially, and located in the plane of the wrist-pin bearings, and an encircling oil-retaining groove at the bottom of the depression which is closed at the bottom and opens at the top into the depression, the wall of the piston having ducts communicating at one end with the groove above the bottom thereof and at their other ends with the interior of the piston body.

4. A piston of the type described comprising a body provided with wrist-pin bearings, and having a portion intermediate its ends which is of reduced external diameter to produce an annular depression completely encircling the body circumferentially and located in the plane of the wrist-pin bearings, and said piston body at the bottom of the depression having an annular oil-retaining trough which is closed at the bottom and opens at the top into the depression.

5. A piston of the type described comprising a hollow body provided with wrist-pin bearings, and having in its outer surface an annular depression completely encircling the same circumferentially, and located in the plane of the wrist-pin bearings, an encircling oil-retaining groove at the bottom of the depression opening thereinto, the outer side wall of the groove being beveled to produce a sharp edge at its junction with the outer surface of the piston body, the wall of the piston having ducts communicating at one end with the groove in the plane of the top thereof and at their other ends with the interior of the piston body.

In testimony whereof I affix my signature.

HUGO B. GRANT.